US008655978B2

(12) United States Patent
Huang

(10) Patent No.: US 8,655,978 B2
(45) Date of Patent: Feb. 18, 2014

(54) DISKLESS PC NETWORK COMMUNICATION AGENT SYSTEM

(75) Inventor: Chia Hsin Huang, Taoyuan Hsien (TW)

(73) Assignee: Jade Quantum Technologies, Inc., Taoyuan Hsien (TW)

( * ) Notice: Subject to any disclaimer, the term of this patent is extended or adjusted under 35 U.S.C. 154(b) by 252 days.

(21) Appl. No.: 13/175,952

(22) Filed: Jul. 5, 2011

(65) Prior Publication Data
US 2013/0013755 A1 Jan. 10, 2013

(51) Int. Cl.
G06F 15/167 (2006.01)

(52) U.S. Cl.
USPC ........... 709/216; 709/219; 709/228; 709/229; 709/230; 709/231; 713/1; 713/2; 713/171

(58) Field of Classification Search
USPC ........................................................ 709/222
See application file for complete search history.

(56) References Cited

U.S. PATENT DOCUMENTS

| | | | | |
|---|---|---|---|---|
| 2003/0187997 A1* | 10/2003 | Alexis | | 709/229 |
| 2006/0029063 A1* | 2/2006 | Rao et al. | | 370/389 |
| 2006/0168280 A1* | 7/2006 | Alexis | | 709/230 |
| 2007/0143611 A1* | 6/2007 | Arroyo et al. | | 713/171 |
| 2007/0261112 A1* | 11/2007 | Todd et al. | | 726/11 |
| 2010/0023597 A1* | 1/2010 | Lu | | 709/216 |
| 2010/0115113 A1* | 5/2010 | Short et al. | | 709/228 |
| 2010/0306399 A1* | 12/2010 | Khosravi et al. | | 709/231 |
| 2013/0007227 A1* | 1/2013 | Hitomi et al. | | 709/219 |

* cited by examiner

Primary Examiner — Lynn Field
Assistant Examiner — Natisha Cox

(57) ABSTRACT

A diskless PC network communication agent system includes a host, a network communication agent, a physical network connecting the network communication agent to the host, and diskless PCs connected to the network communication agent. The network communication agent has network packet filtering and transferring functions so that a virtual private network is established between the network communication agent and the diskless PCs for enabling each diskless PC to use a pre-boot execution environment communication protocol to catch dynamic host configuration protocol information, to start up network bootstrap, and to request the host for the services of remote installation, boot and access to virtual disk.

12 Claims, 4 Drawing Sheets

DISKLESS PC NETWORK COMMUNICATION AGENT SYSTEM

BACKGROUND OF THE INVENTION

1. Field of the Invention

The present invention relates to network communication technology and more particularly, to a diskless PC network communication agent system, which establishes a virtual private network between each network communication agent and each diskless PC so that each diskless PC can normally use preboot environment communication protocol to catch dynamic host configuration protocol information for booting through the network.

2. Description of the Related Art

In order to overcome the problem that a big number of diskless PCs (personal computers) cannot be flexibly deployed due to standard preboot execution environment (PXE) technical limitations, different techniques are developed. Exemplars are seen in U.S. Pat. No. 6,735,692B1; U.S. Pat. No. 6,871,210B1; U.S. Pat. No. 7,085,021B2. These techniques either add extra management devices to the preboot execution environment network or extend the preboot execution environment communication protocol by adding management messages for computer arrangement. The techniques applied by the aforesaid patented designs, however, do not consider the limitation that dynamic configuration protocol (DHCP) information for PXE-enable PCs to boot through network is broadcasted on the network where is divided into segments in natural. In consequence, the broadcast-based DHCP information cannot go through network segments. Adding an extra management device to a preboot execution environment network facilitates management, however, this method cannot effectively avoid the congenital defects of preboot execution environment techniques, such as the problem that when multiple DHCP servers may interfere with one another if they exist in one same network segment, causing instability of preboot execution environment techniques.

SUMMARY OF THE INVENTION

The present invention has been accomplished under the circumstances in view. It is the main object of the present invention to provide a diskless PC network communication agent system, which overcomes network environment limitations, allowing flexible arrangement and management of a big number of diskless computers spread in the network environment of multiple segments.

To achieve this and the objects of the present invention, a diskless PC network communication agent system comprises a host, a network communication agent, a physical network connecting the network communication agent to the host, and diskless PCs connected to the network communication agent, wherein the network communication agent has network packet filtering and transferring functions so that a virtual private network (VPN) is established between the network communication agent and the diskless PCs for enabling each diskless PC to use a preboot execution environment (PXE) communication protocol to catch dynamic host configuration protocol (DHCP) information, to start up network bootstrap, and to request the host for the services of remote installation, boot, and access to virtual disks.

DETAILED DESCRIPTION OF THE PREFERRED EMBODIMENT

Figure 1:
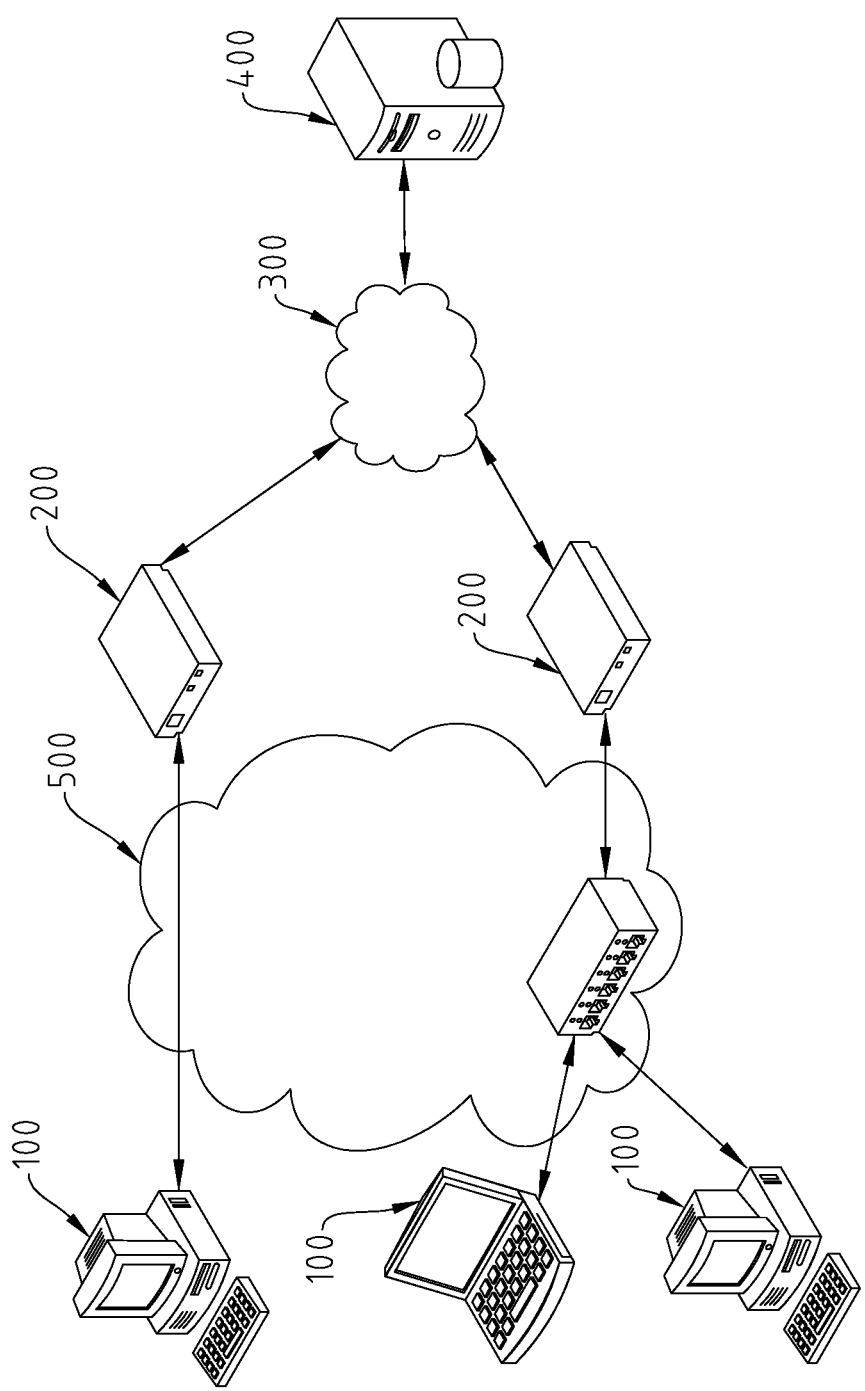
FIG. 1 is a schematic drawing illustrating an arrangement of a diskless PC network communication agent system in accordance with the present invention.

Referring to FIG. 1, a diskless PC network communication agent system in accordance with the present invention includes a host 400, at least one network communication agent 200, a physical network 300 connecting each network communication agent 200 to the host 400, and at least one diskless PC (personal computer) 100 connected to each network communication agent 200 to constitute a VPN (virtual private network) 500 between the network communication agents 200 and the diskless PCs 100.

Further, the host 400 can be a storage server, a management server or a game server. In this embodiment, a storage server is used for the host 400 for easy explanation.

Figure 2:
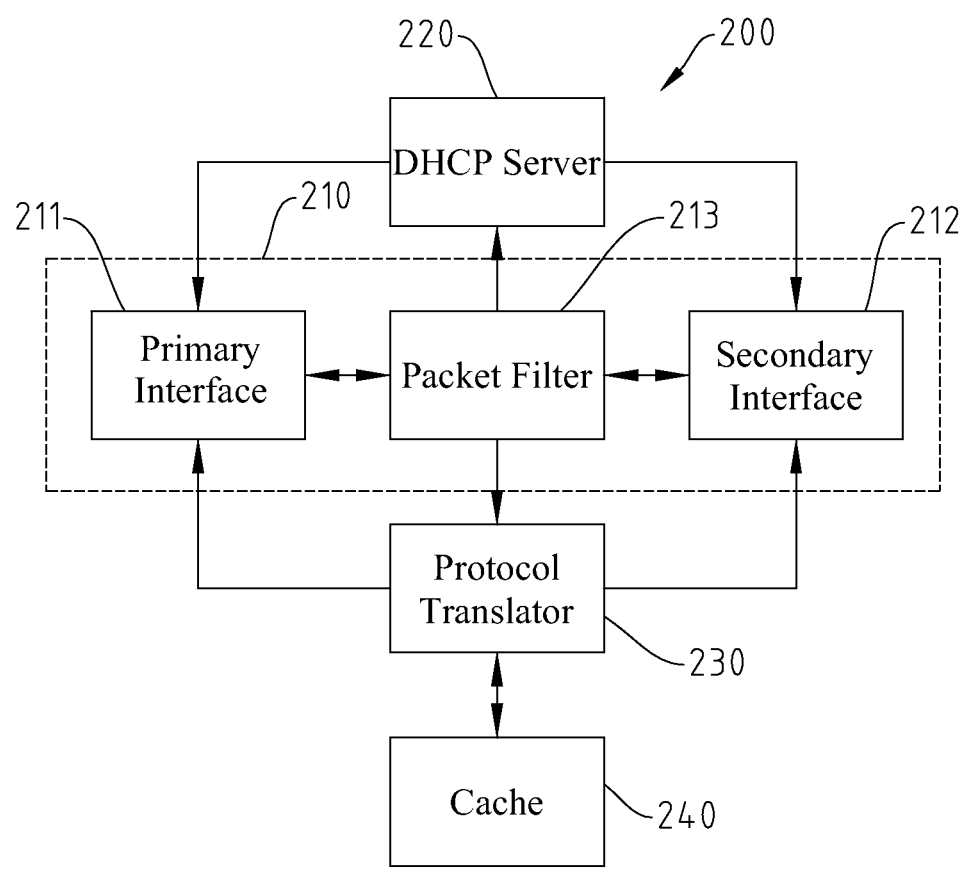
FIG. 2 is a block diagram of the diskless PC network communication agent system in accordance with the present invention.

Referring to FIG. 2 and FIG. 1 again, each network communication agent 200 comprises a multi-interface switch 210, a DHCP (dynamic host configuration protocol) server 220, a protocol translator 230 and a cache 240.

The multi-interface switch 210 is adapted for connecting the respective diskless PC 100 and the physical network 300 for data exchange, comprising a primary interface 211, a secondary interface 212 and a packet filter 213. The primary interface 211 is adapted for connecting the respective diskless PCs 100 and handling the exchanging data in the VPN 500 between the primary interface 211 and the diskless PCs 100 and the exchanging data between diskless PCs 100. The primary interface 211 is a high speed interface in the computer system, such as the Ethernet, the wireless network, USB, eSATA or PCI express. The secondary interface 212 is adapted for connecting the physical network 300 and handling the exchanging data between the physical network 300 and the host 400. Further, the secondary interface 212 is a high speed interface in the computer system, such as the Ethernet or the wireless network. The packet filter 213 is adapted for analyzing and filtering network packets to discriminate the VPN 500 packets from the physical network 300 packets.

The DHCP server 220 is adapted for handling and responding to DHCP requests, providing the DHCP information required for the diskless PC 100 in the VPN 500 using PXE, and also providing DHCP information that can be set manually or by a computer at an external physical network segment by means of a communication protocol control.

The protocol translator 230 is adapted for transferring communication protocol packets issued by the diskless PCs 100 at the VPN 500 for accessing to a remote storage device on the host 400 at the physical network 300, and also for transferring data blocks returned from the host 400 to the respective diskless PCs 100. During transfer, the protocol translator 230 can use a communication protocol different from what is used by the diskless PCs 100 and the host 400 and make a translation therebetween.

The cache 240 is adapted for temporarily storing the data blocks processed by the protocol translator 230 in a memory space for quick data access by the diskless PCs 100. The cache 240 also provides an asynchronous write buffer, enabling data to be temporarily stored in the cache 240 when one of the diskless PCs 100 is writing to the host 400 so that the cache 240 can synchronously provide the data to the host 400 at the proper time.

Figure 3:
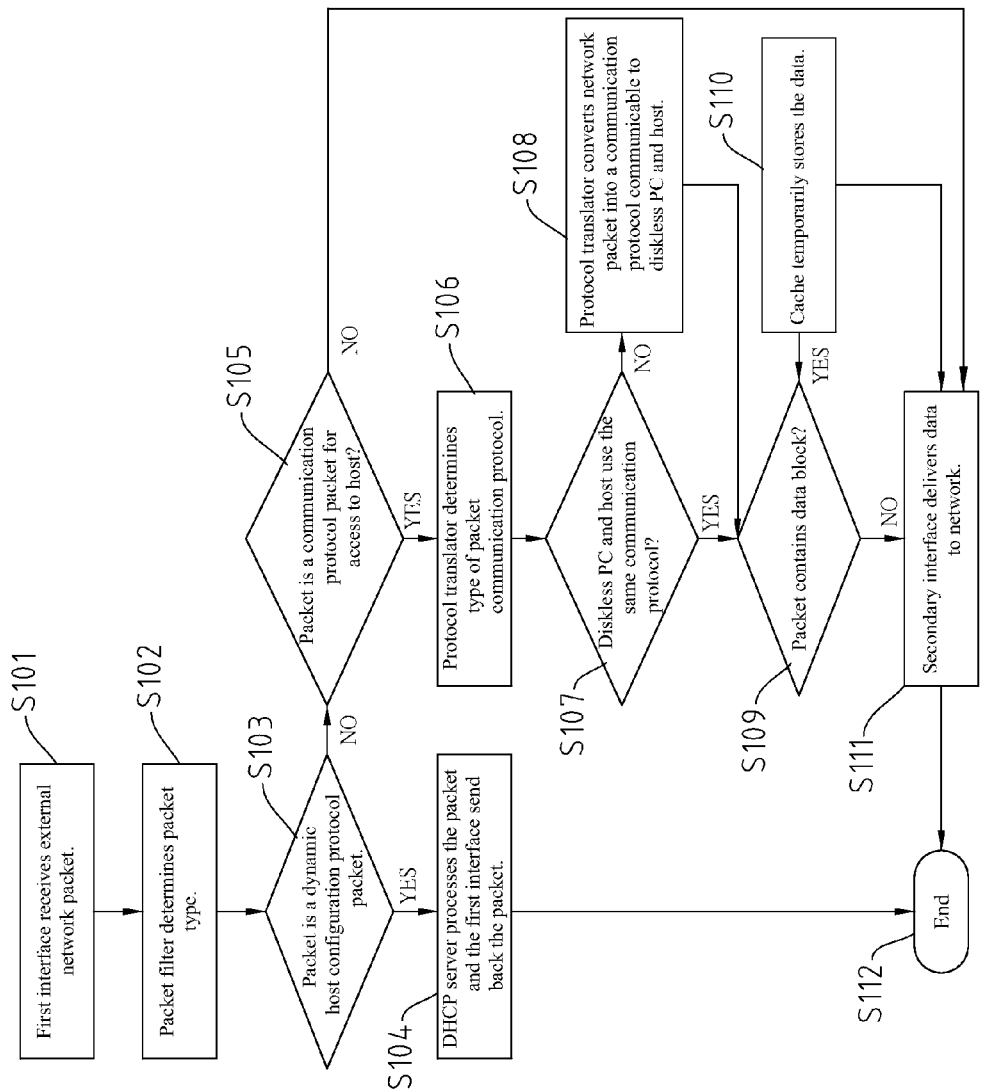
FIG. 3 is a flow chart illustrating the operation of the diskless PC network communication agent system upon receipt of a network packet by the primary interface from one diskless PC in the virtual private network.

Referring to FIGS. 1-3, when the primary interface 211 of the network communication agent 200 receives a network packet from one diskless PC 100 at the VPN 500, it runs subject to the following steps:

S101: Handle the network packet of the diskless PC 100 to the packet filter 213.

S102: The packet filter 213 analyzes and filters the network packet.

S103: The packet filter 213 determines whether or not the network packet is a DHCP type? And then it proceeds to step S104 when positive, or step S105 when negative.

S104: Handle the network packet to the DHCP server 220, and provide the DHCP information set by the manager and required for the diskless PC 100 for remote boot by means of PXE technique to the diskless PC 100 through the primary interface 211, and then proceed to step S212.

S105: The packet filter 213 determines whether or not the network packet is a communication protocol packet for access to the host 400? And then, proceed to step S105 when positive, or step S111 when negative.

S106: Handle the network packet to the protocol translator 230 for processing, and then proceed to step S107.

S107: The protocol translator 230 determines whether or not the diskless PC 100 and the host 400 use the same communication protocol? And then, proceed to step S109 when positive, or step S108 when negative.

S108: The protocol translator 230 converts the network packet into a communication protocol communicable to the respective diskless PC 100 and the host 400. And then, proceed to step S109.

S109: The protocol translator 230 determines whether or not the network packet contains a data block necessary for the diskless PC 100 to make disk access? And then, proceed to step S110 when positive, or step S111 when negative.

S110: Handle the data block of the network packet, the related disk address, data length, and the version number to the cache 240 for registration, and then proceed to step S111.

S111: Handle the network packet to the secondary interface 212 for delivery, and then proceed to step S112.

S112: End.

Figure 4:
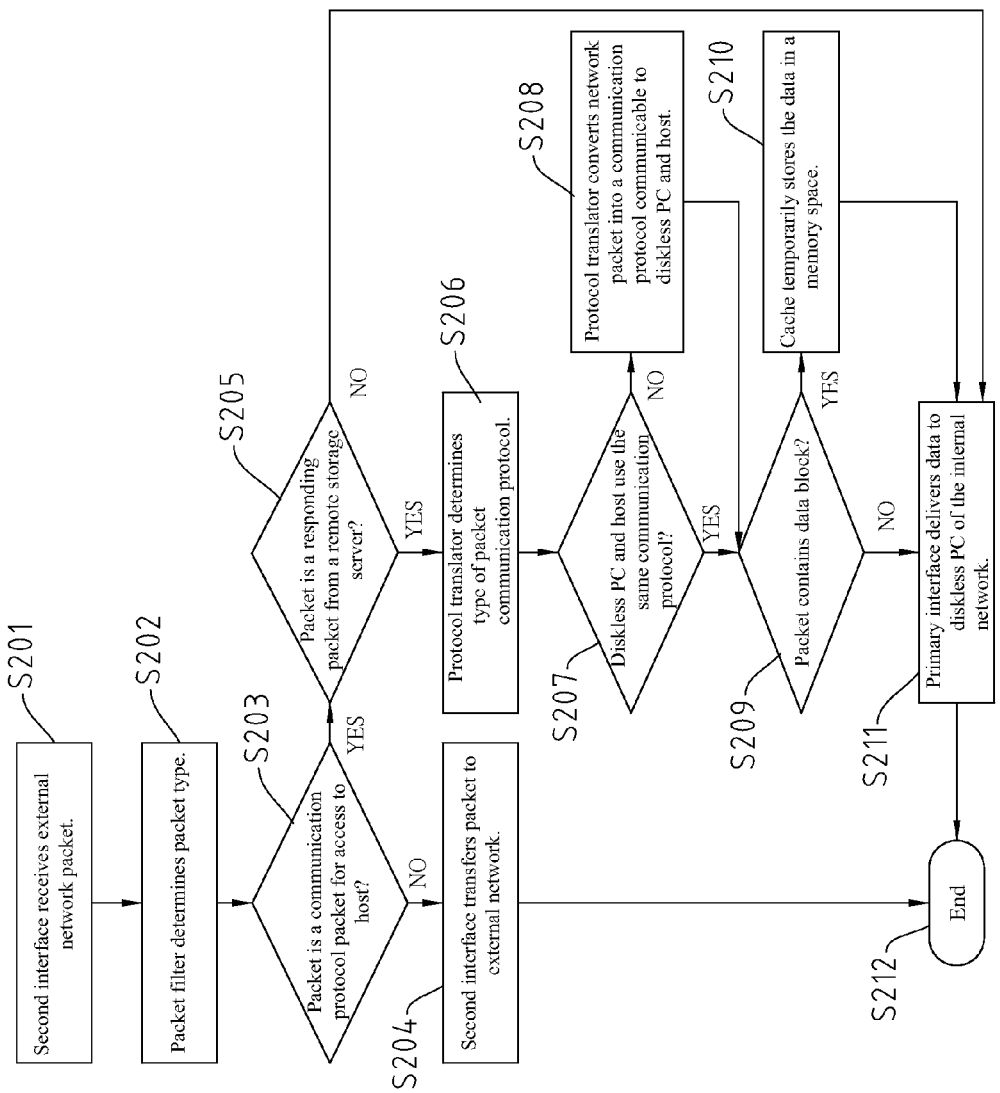
FIG. 4 is a flow chart illustrating the operation of the diskless PC network communication agent system upon receipt of an external network packet by the secondary interface.

Referring to FIG. 4 and FIGS. 1 and 2 again, when the secondary interface 212 of the network communication agent 200 receives an external network packet, it runs subject to the following steps:

S201: The secondary interface 212 handles the received network packet to the packet filter 213.

S202: The packet filter 213 analyzes and filters the network packet.

S203: The packet filter 213 determines whether or not the destination of this external network packet is the diskless PC 100? And then proceed to step S205 when positive, or step S204 when negative.

S204: Return this external network packet to the external network by means of the secondary interface 212, and then proceed to step S212.

S205: The packet filter 213 determines whether or not this external network packet is responded by the host 400? And then, proceed to step S206 when positive, or step S211 when negative.

S206: Handle this external network packet to the packet filter 213, and then proceed to step S207.

S207: The protocol translator 230 determines whether or not the diskless PC 100 and the host 400 use the same communication protocol? And then, proceed to step S209 when positive, or step S208 when negative.

S208: The protocol translator 230 converts this external network packet into a communication protocol communicable to the respective diskless PC 100 and the host 400. And then, proceed to step S209.

S209: The protocol translator 230 determines whether or not this external network packet contains a data block necessary for the diskless PC 100 to make disk access? And then, proceed to step S210 when positive, or step S211 when negative.

S210: Handle the data block of this external network packet, the related disk address, data length, and the version number to the cache 240 for registration, and then proceed to step S211.

S211: Handle this external network packet to the primary interface 211 for delivery to the diskless PC 100, and then proceed to step S212.

S212: End.

In conclusion, the invention uses a network communication agent 200 to isolate diskless PCs 100 in a VPN 500, in which diskless PCs 100 can normally use PXE and DHCP techniques to boot without affecting the flexibility of its arrangement due to the setting of the physical network 300. Further, a network communication agent 200 in accordance with the present invention comprises a cache 240 for quick read/write data cache, lowering the work load of the host 400 and the network bandwidth and improving the boot speed or application program execution speed of the diskless PCs 100.

Therefore, using the present invention effectively eliminates the problems of lack of flexibility in deployment of a big number of diskless PCs 100 in complex network environment. Also, it can greatly lowers the work load of the host 400 and the network bandwidth.

Although a particular embodiment of the invention has been described in detail for purposes of illustration, various modifications and enhancements may be made without departing from the spirit and scope of the invention.

What the invention claimed is:

1. A diskless PC network communication agent system, comprising:
   a host;
   at least one network communication agent;
   a physical network connecting each said network communication agent to said host; and
   at least one diskless personal computer (PC) connected to said at least one network communication agent;
   wherein each said network communication agent has network packet filtering and transferring functions so that a virtual private network (VPN) is established between said at least one network communication agent and said at least one diskless PC for enabling each said diskless PC to use a preboot execution environment (PXE) communication protocol to catch dynamic host configuration protocol (DHCP) information, to start up network booting, and to request the host for services comprising remote installation, boot, and access to virtual disks;
   wherein each network communication agent comprises:
   a multi-interface switch adapted for connecting said at least one diskless PC to said physical network for data exchange with said host and for allowing establishment of a virtual private network between the respective network communication agent and said at least one diskless PC, each multi-interface switch comprising:

a primary interface adapted for connecting to said at least one diskless PC and handling exchanging data between said primary interface and said at least one diskless PC and exchanging data between said at least one diskless PC and another diskless PC;

a secondary interface adapted for connecting to said physical network and handling exchanging data between said physical network and said host; and a packet filter adapted for analyzing and filtering network packets to discriminate virtual private network packets from physical network packets;

a DHCP server adapted for handling and responding to DHCP requests provided by said at least one diskless PC; and a protocol translator adapted for translating communication protocol packets between said at least one diskless PC and said host.

2. The diskless PC network communication agent system as claimed in claim 1, wherein each said network communication agent comprises a cache adapted for storing data blocks processed by said protocol translator in a memory space for data access by said at least one diskless PC.

3. The diskless PC network communication agent system as claimed in claim 2, wherein:

when said primary interface of said network communication agent receives a network packet from one of said diskless PCs, the diskless PC network communication agent system is configured to perform the following processing steps comprising:

step A: handing the network packet to said packet filter for analysis, enabling said packet filter to determine if the network packet is a DHCP network, and then proceeding to step B when the network packet is determined to be a DHCP network packet;

step B: handing the network packet to said DHCP server, and providing DHCP parameters set by a manager and required for said diskless PC for remote booting by means of the PXE processing technique to said at least one diskless PC through said primary interface, and then proceeding to step C; and step C: processing steps for the network packet are completed.

4. The diskless PC network communication agent system as claimed in claim 3, wherein when the network packet is determined not a DHCP network packet, the diskless PC network communication agent system proceeds to step D, wherein, in step D said packet filter determines if the network packet is a communication protocol packet for access to said host, and then the diskless PC network communication agent system proceeds to step E, wherein:

in a step E the diskless PC network communication agent system hands the network packet to said protocol translator for processing, and then said protocol translator determines if said at least one diskless PC and said host use or not use the same communication protocol, and then, the diskless PC network communication agent system proceeds to step F when said at least one diskless PC and said host use the same communication protocol;

wherein in a step F said protocol translator determines if the network packet contains a data block required for the respective diskless PC to perform disk access, and then said protocol translator proceeds to step G when the network packet contains a data block required for the respective diskless PC to perform disk access;

wherein in a step G said protocol translator hands the data block of the network packet, the related disk address, data length and, a version number to said cache for registration, and then proceeds to step H; and wherein in a step H said cache hands the network packet to said secondary interface for delivery, and then the system performs step C.

5. The diskless PC network communication agent system as claimed in claim 4, wherein when the network packet is not a communication protocol packet for access to said host during step D, said packet filter hands the network packet to said secondary interface for delivery to an external network, and then performs step C.

6. The diskless PC network communication agent system as claimed in claim 4, wherein said protocol translator converts the network packet into a communication protocol communicable to the respective diskless PC and said host when the respective diskless PC and said host use different communication protocols during step E, and then proceeds to step F.

7. The diskless PC network communication agent system as claimed in claim 4, wherein said protocol translator proceeds to step H when the network packet does not contain therein a data block required for the respective diskless PC to perform disk access during step F.

8. The diskless PC network communication agent system as claimed in claim 1, wherein each said network communication agent further comprises a cache adapted for storing data blocks processed by said protocol translator in a memory space for data access by said at least one diskless PC; wherein when said secondary interface of said network communication agent receives a network packet from an external network, the diskless PC network communication agent system is configured to perform the following processing steps comprising:

step A: hand the network packet to said packet filter for analysis, enabling said packet filter to determine a destination of the network packet, and then to proceed to step B when the destination of the network packet is not one said diskless PC;

wherein in a step B the network packet is handed to said secondary interface for delivery to the external network and then step C is performed; and wherein in a step C the processing steps for the network packet are completed.

9. The diskless PC network communication agent system as claimed in claim 8, wherein the diskless PC network communication agent system is further configured to perform the following steps:

step D: said network filter determines a source of the external network packet, and then proceeds to step E when the external network packet is a packet from said host;

step E: said network filter hands the external network packet to said protocol translator for analyzing the communication protocol, and then the diskless PC network communication agent system proceeds to step F when the respective diskless PC and said host use the same communication protocol;

wherein in step F said protocol translator determines contents of the external network packet, and then proceeds to step G when the external network packet has a data block required for the respective diskless PC to perform disk access;

wherein in a step G said protocol translator hands the data block of the external network packet, the related disk address, data length, and a version number to said cache for registration, and then proceeds to step H; and wherein in a step H said cache hands the external network packet to said primary interface for delivery to the respective diskless PC, and then the system performs step C.

10. The diskless PC network communication agent system as claimed in claim 9, wherein said network filter proceeds to step H when the external network packet is not a packet from said host during step D.

11. The diskless PC network communication agent system as claimed in claim 9, wherein said protocol translator converts the external network packet into a communication protocol communicable to the respective diskless PC and said host when the respective diskless PC and said host use different communication protocols during step E, and then proceeds to step F.

12. The diskless PC network communication agent system as claimed in claim 9, wherein said protocol translator proceeds to step H when the external network packet contains no data block required for the respective diskless to perform disk access during step F.

* * * * *